(12) United States Patent
Ahn (10) Patent No.: US 12,420,778 B2
(45) Date of Patent: Sep. 23, 2025

(54) CONTROL METHOD AND DEVICE OF MOBILE ROBOT

(71) Applicant: HL Robotics Co., Ltd., Seongnam-si (KR)

(72) Inventor: Jaewan Ahn, Yongin (KR)

(73) Assignee: HL ROBOTICS CO., LTD., Seongnam-si (KR)

( * ) Notice: Subject to any disclaimer, the term of this patent is extended or adjusted under 35 U.S.C. 154(b) by 211 days.

(21) Appl. No.: 18/212,377

(22) Filed: Jun. 21, 2023

(65) Prior Publication Data

US 2024/0300480 A1 Sep. 12, 2024

(30) Foreign Application Priority Data

Mar. 8, 2023 (KR) .................. 10-2023-0030413

(51) Int. Cl.
*B60W 30/09* (2012.01)
*B60W 40/105* (2012.01)

(52) U.S. Cl.
CPC .......... *B60W 30/09* (2013.01); *B60W 40/105* (2013.01); *B60W 2520/06* (2013.01); *B60W 2520/10* (2013.01)

(58) Field of Classification Search
CPC .............. B60W 30/09; B60W 40/105; B60W 2520/06; B60W 2520/10

USPC ........................................................... 701/26
See application file for complete search history.

(56) References Cited

U.S. PATENT DOCUMENTS

| | | | |
|---|---|---|---|
| 8,060,306 B2* | 11/2011 | Puhalla | B60W 40/072 701/93 |
| 12,038,753 B2* | 7/2024 | Xia | G05D 1/0223 |
| 2022/0187838 A1* | 6/2022 | Kim | A47L 9/2805 |
| 2023/0023551 A1* | 1/2023 | Tanisaka | G05D 1/0214 |
| 2023/0144509 A1* | 5/2023 | Yun | G05D 1/0225 15/319 |
| 2023/0294682 A1* | 9/2023 | Kim | G06T 7/70 |
| 2024/0025040 A1* | 1/2024 | Vangal Ramamurthy | G09B 29/006 |

* cited by examiner

*Primary Examiner* — Andrew Joseph Rudy
(74) *Attorney, Agent, or Firm* — Hauptman Ham, LLP (57) ABSTRACT

The present disclosure relates to a method of controlling a mobile robot. The method includes: calculating a traveling speed and a rotation speed of a mobile robot traveling based on a first traveling route; changing a first area for detecting an obstacle based on at least a portion of the calculated traveling speed and rotation speed of the mobile robot; and when an obstacle is detected in the changed first area, determining a second traveling route for avoiding the detected obstacle.

7 Claims, 5 Drawing Sheets

CONTROL METHOD AND DEVICE OF MOBILE ROBOT

CROSS-REFERENCE TO RELATED APPLICATIONS

This application claims benefit and priority to Korean Patent Application No. 10-2023-0030413, filed on Mar. 8, 2023, with the Korean Intellectual Property Office, the disclosure of which is incorporated herein in its entirety by reference.

TECHNICAL FIELD

The present disclosure relates to a control method and device of a mobile robot, and particularly, to a method and a device for controlling a mobile robot which optimize a traveling route by changing an obstacle detection area according to a speed of the mobile robot and the like.

BACKGROUND

Mobile robots that navigate themselves through various sensors and control devices, such as cameras, radar, and lidar, are being used in various industries. For example, a mobile robot is capable of traveling itself to a destination by using a route planning algorithm, and is capable of traveling while avoiding obstacles in the route. On the other hand, when an obstacle exists within a certain detection range of the sensor, the mobile robot may detect the obstacle and generate an avoidance route to avoid colliding with the obstacle. However, when the detection range is fixed as described above, even if the possibility of the actual collision of the mobile robot with an obstacle is low, it may be necessary to set an avoidance route and go around unnecessarily long distances, which may reduce the traveling efficiency of the mobile robot.

SUMMARY

The present disclosure is conceived in response to the background art, and has been made in an effort to provide a method of controlling a mobile robot, and a non-transitory computer-readable medium for storing instructions.

The present disclosure may be implemented in various methods including non-transitory computer-readable medium storing a method, a device (system), or a computer program.

An exemplary embodiment of the present disclosure provides a method of controlling a mobile robot, the method being performed by at least one processor, the method including:

calculating a traveling speed or a rotation speed of the mobile robot; changing the size of a first area or the size of a second area based on the traveling speed or the rotation speed; and controlling the mobile robot to perform a stop maneuver or an avoidance maneuver, the stop maneuver being performed when an obstacle is detected in the second area and the avoidance maneuver being performed when an obstacle is detected in the first area; wherein the second area is defined by a predetermined size extended from the mobile robot, in which the mobile robot is controlled to perform a stop maneuver upon detecting an obstacle, wherein the first area is defined outside the second area and adjacent to the second area, in which the mobile robot is controlled to perform an avoidance maneuver upon detecting an obstacle, and wherein the size of the first area or the second area is changed proportional to the traveling speed or the rotation speed.

According to the exemplary embodiment of the present disclosure, wherein changing the size of the first area or the size of the second area comprises reducing the size of the first area or the size of the second area when the traveling speed or the rotation speed is decreased.

According to the exemplary embodiment of the present disclosure, wherein changing the size of the first area or the size of the second area further comprises enlarging the size of the first area or the size of the second area when the traveling speed or the rotation speed is increased.

Another exemplary embodiment of the present disclosure provides a non-transitory computer-readable recording medium storing instructions for executing a method in a computer.

Another exemplary embodiment of the present disclosure provides a control device for a mobile robot including: a communication module; a memory; and at least one processor connected with the memory and configured to execute at least one computer-readable program included in the memory. wherein the processor is configured to: calculate a traveling speed or a rotation speed of the mobile robot; change the size of a first area or the size of a second area based on the traveling speed or the rotation speed; and control the mobile robot to perform a stop maneuver or an avoidance maneuver, the stop maneuver being performed when an obstacle is detected in the second area and the avoidance maneuver being performed when an obstacle is detected in the first area; wherein the second area is defined by a predetermined size extended from the mobile robot, in which the mobile robot is controlled to perform a stop maneuver upon detecting an obstacle, wherein the first area is defined outside the second area and adjacent to the second area, in which the mobile robot is controlled to perform an avoidance maneuver upon detecting an obstacle, and wherein the size of the first area or the second area is changed in proportion to the traveling speed or the rotation speed.

According to the exemplary embodiment of the present disclosure, wherein the processor configured to reduce the size of the first area or the size of the second area when the traveling speed or the rotation speed is decreased.

According to the exemplary embodiment of the present disclosure, wherein the processor further configured to enlarge the size of the first area or the size of the second area when the traveling speed or the rotation speed is increased.

In various exemplary embodiments of the present disclosure, the computing device may reduce the obstacle detection area for locations that do not interfere with the expected traveling direction of the mobile robot, thereby overcoming a traveling performance degradation phenomenon that may occur when the obstacle detection area is constant.

In various exemplary embodiments of the present disclosure, it is possible to prevent unnecessary waste of computing resources, such as setting an avoidance route in a situation where a possibility of colliding with an obstacle is reduced by the speed of the mobile robot, and enable the mobile robot to travel to a destination in a more efficient route.

The effects of the invention are not limited to those mentioned above, and other effects not mentioned will be apparent from the description of the claims to a person of ordinary skill in the art to which the present disclosure belongs.

BRIEF DESCRIPTION OF THE DRAWINGS

Exemplary embodiments of the present disclosure will be described with reference to the accompanying drawings, which are described below, wherein like reference numerals indicate like elements, but are not limited to.

DETAILED DESCRIPTION

Hereinafter, particular contents for carrying out the present disclosure will be described in detail with reference to the accompanying drawings. However, in the following description, specific descriptions of widely known features or configurations will be omitted if they may unnecessarily obscure the essence of the present disclosure.

In the attached drawings, identical or corresponding components are given the same reference numeral. In addition, in the description of the exemplary embodiments below, overlapping description of the same or corresponding constituent elements may be omitted. However, the omission of any description of a component is not intended to prevent such component from being included in any exemplary embodiment.

The advantages and characteristics of the disclosed exemplary embodiment, and a method for achieving the advantages and characteristics will become clear by referring to the exemplary embodiment, which is described in detail, together with the accompanying drawings. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure.

Terms used in this specification will be briefly described, and the disclosed exemplary embodiments will be described in detail. The terms used in this specification have been selected as currently widely used general terms as possible while considering the functions in the present disclosure, but this may vary depending on the intention or precedent of the engineer in the related field, the emergence of new technology, and the like. In addition, in specific cases, there are also terms arbitrarily selected by the applicant, and in this case, the meaning will be described in detail in the description of the relevant invention. Accordingly, the term used in the present disclosure should be defined based on the meaning of the term and the entire contents of the present disclosure, simply not a name of the term.

In the present specification, the singular expression includes the plural expression unless the context clearly dictates the singular. Further, the plural expression includes the singular expression unless the context clearly dictates the plural. Further, when a part "includes" other constituent elements, this means that other constituent elements may be further included, rather than excluding other constituent elements, unless otherwise stated.

In the present disclosure, terms such as "comprises", "comprising", and the like may indicate that features, steps, operations, elements and/or constituent elements are present, but this term does not exclude the addition of one or more other functions, steps, operations, elements, constituent elements, and/or combinations thereof.

In the present disclosure, when a particular constituent element is referred to as "is coupled to", "is combined with", "is connected to", or "reacts" to another constituent element, the particular constituent element may be directly coupled to, combined with, and/or connected to or may react with another constituent element, but the present disclosure is not limited thereto. For example, there may be one or more intermediate constituent elements between a particular constituent element and another constituent element. In addition, in the present disclosure, "and/or" may include each of one or more of the listed items or combinations of at least a portion of one or more of the items.

In the present disclosure, terms such as "a first" and "a second" are used to distinguish a specific constituent element from other constituent elements, and the above-described constituent elements are not limited by these terms. For example, a "first" constituent element may be an element of the same or similar type as a "second" constituent element.

Figure 1:
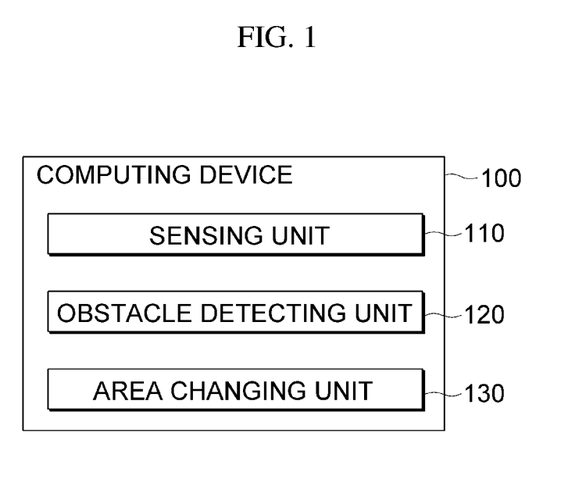
FIG. 1 is a functional block diagram illustrating an internal configuration of a computing device according to an exemplary embodiment of the present disclosure.

FIG. 1 is a functional block diagram illustrating an internal configuration of a computing device 100 according to an exemplary embodiment of the present disclosure. As illustrated in FIG. 1, the computing device 100 is a predetermined device for controlling a mobile robot, and may include a sensing unit 110, an obstacle detecting unit 120, an area changing unit 130, and the like.

According to the exemplary embodiment, the sensing unit 110 may detect a surrounding environment of the mobile robot by using various sensors. For example, a mobile robot is a sensor for detecting a surrounding object, such as an obstacle, and may include, but is not limited to, camera sensors, lidar sensors, radar sensors, and the like. Here, the sensors may be arranged in the front center and/or corners of the mobile robot, and the sensing unit 110 may detect and provide to the computing device 100 an angle, a distance, relative speed, relative acceleration, and the like of a surrounding object by using the sensors. Furthermore, the sensing unit 110 may detect a traveling speed, rotation speed, acceleration, and the like of the mobile robot based on various publicly known sensors, such as wheel sensors, and provide the detected traveling speed, rotation speed, acceleration, and the like of the mobile robot to the computing device 100.

According to the exemplary embodiment, the area detected by the sensing unit 110 may consist of a plurality of areas. For example, the plurality of areas may include an attention area (for example, a first area) in which an avoidance maneuver is performed when an obstacle is detected, a danger area (for example, a second area) which is defined by predetermined size extended from the mobile robot 200 in which a stop maneuver is performed when an obstacle is detected, and a safety area (for example, a third area) which is located outside the attention area and in which a normal maneuver is performed even when an obstacle is detected. The attention area is defined outside the danger area and adjacent to the danger area.

According to the exemplary embodiment, the obstacle detecting unit 120 may detect obstacles or the like in the vicinity of the mobile robot based on various information obtained by the sensing unit 110. For example, the obstacle detecting unit 120 may provide sensor data obtained from camera sensors, radar sensors, lidar sensors, and the like to a predetermined object detection algorithm and/or machine learning model to detect obstacles in the vicinity of the mobile robot. In this case, the obstacle detecting unit 120 may determine whether the obstacle is located in one of the attention area, the danger area, and/or the safety area.

According to the exemplary embodiment, the area changing unit 130 may variably change the area for obstacle detection based on various information obtained by the sensing unit 110. That is, the area changing unit 130 may change the size and/or shape of the attention area, danger area, and/or safety area for obstacle detection based on the traveling speed and rotation speed of the mobile robot. For example, as the traveling speed and/or rotation speed of the mobile robot increases, the time to collide with an obstacle may decrease. Accordingly, the area changing unit 130 may increase the size of the attention area, danger area, and/or safety area as the traveling speed and the rotation speed of the mobile robot increase to prepare for the risk of collision with an obstacle. Conversely, the area changing unit 130 may change the size of the attention area, the danger area, and/or the safety area to be smaller as the traveling speed and the rotation speed of the mobile robot decrease, and accordingly, the mobile robot may be controlled to avoid making unnecessary avoidance traveling when a possibility of collision with an obstacle does not exist even though the mobile robot travels along the traveling route, thereby increasing traveling efficiency.

Additionally or alternatively, the area changing unit 130 may detect a heading angle of the mobile robot based on the rotation speed, and change the shape of the attention area, the danger area, and/or the safety area based on the detected heading angle. Here, the area changing unit 130 may determine an expected turning route of the mobile robot based on the heading angle, and may change the shape of the attention area, the danger area, and/or the safety area to correspond to the determined expected turning route. For example, the area change unit 130 may determine the shape of the attention area, danger area, and/or safety area to be a rectangular area in front of the mobile robot when the mobile robot is traveling straight. In another example, the area change unit 130 may determine the shape of the attention area, the danger area, and/or the safety area to be curved in the direction of the turn when the mobile robot is turning.

According to the exemplary embodiment, the computing device 100 may determine a traveling route for the mobile robot. For example, the computing device 100 may determine a traveling route for the mobile robot by using a predetermined route planning algorithm and/or machine learning model. In this case, the mobile robot may travel along the determined traveling route. When the mobile robot travels along the traveling route, and when an obstacle is detected in the area, the mobile robot may travel while avoiding the obstacle or stop. For example, when an obstacle is detected in the attention area that has changed in size and/or shape, the computing device 100 may determine an avoidance route to avoid the obstacle and may travel on the determined avoidance route. In other examples, when an obstacle is detected in the danger area that has changed in size and/or shape, the computing device 100 may stop the mobile robot.

Each of the functional configurations included in the computing device 100 is illustrated separately in FIG. 1, but this is for purposes of illustrating the invention only, and more than one function may be performed by a single computing device. By such a configuration, the computing device 100 may reduce the obstacle detection area in a location that does not interfere with the expected traveling direction of the mobile robot, and thus a traveling performance degradation phenomenon that may occur when the obstacle detection area is constant may be overcome.

Figure 2:
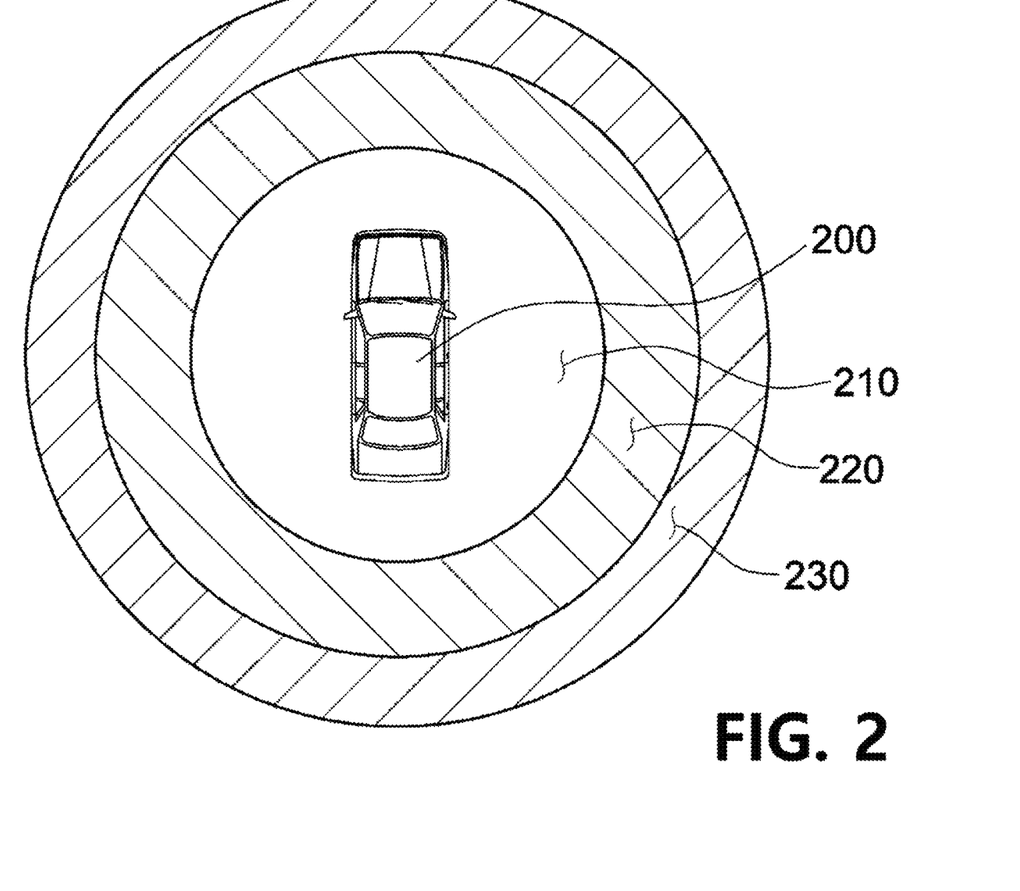
FIG. 2 is a diagram illustrating an example of an obstacle detection area according to an exemplary embodiment of the present disclosure.

FIG. 2 is a diagram illustrating an example of the obstacle detection area according to the exemplary embodiment of the present disclosure. As illustrated, an obstacle detection area may be present to detect objects in the vicinity of the mobile robot 200. In this case, the obstacle detection area may include a danger area 210 for performing a stop maneuver of the mobile robot, an attention area 220 for performing an avoidance maneuver of the mobile robot, and a safety area 230 for performing a normal maneuver of the mobile robot, and may be configured so that the safety area 230 is defined outside the attention area 220 and the attention area 220 is defined between the danger area 210 and the safety area 230.

According to the exemplary embodiment, the mobile robot 200 may travel along a predetermined traveling route while sensing surrounding objects based on the obstacle detection area. For example, when an obstacle is detected in the safety area 230, the mobile robot 200 may determine that there is no possibility of colliding with the obstacle and may travel along the predetermined traveling route without performing an avoidance traveling. Additionally, when an obstacle is detected in the attention area 220, the mobile robot 200 may determine that there is a possibility of colliding with the obstacle and may perform an avoidance traveling. Additionally, when an obstacle is detected in the danger area 210, the mobile robot 200 may stop to block collision with the obstacle and await a subsequent control instruction.

In FIG. 2, the obstacle detection area is illustrated as being in the form of a circle that includes the mobile robot, but is not limited thereto, and the obstacle detection area may be configured in other sizes and/or shapes.

Figure 3:
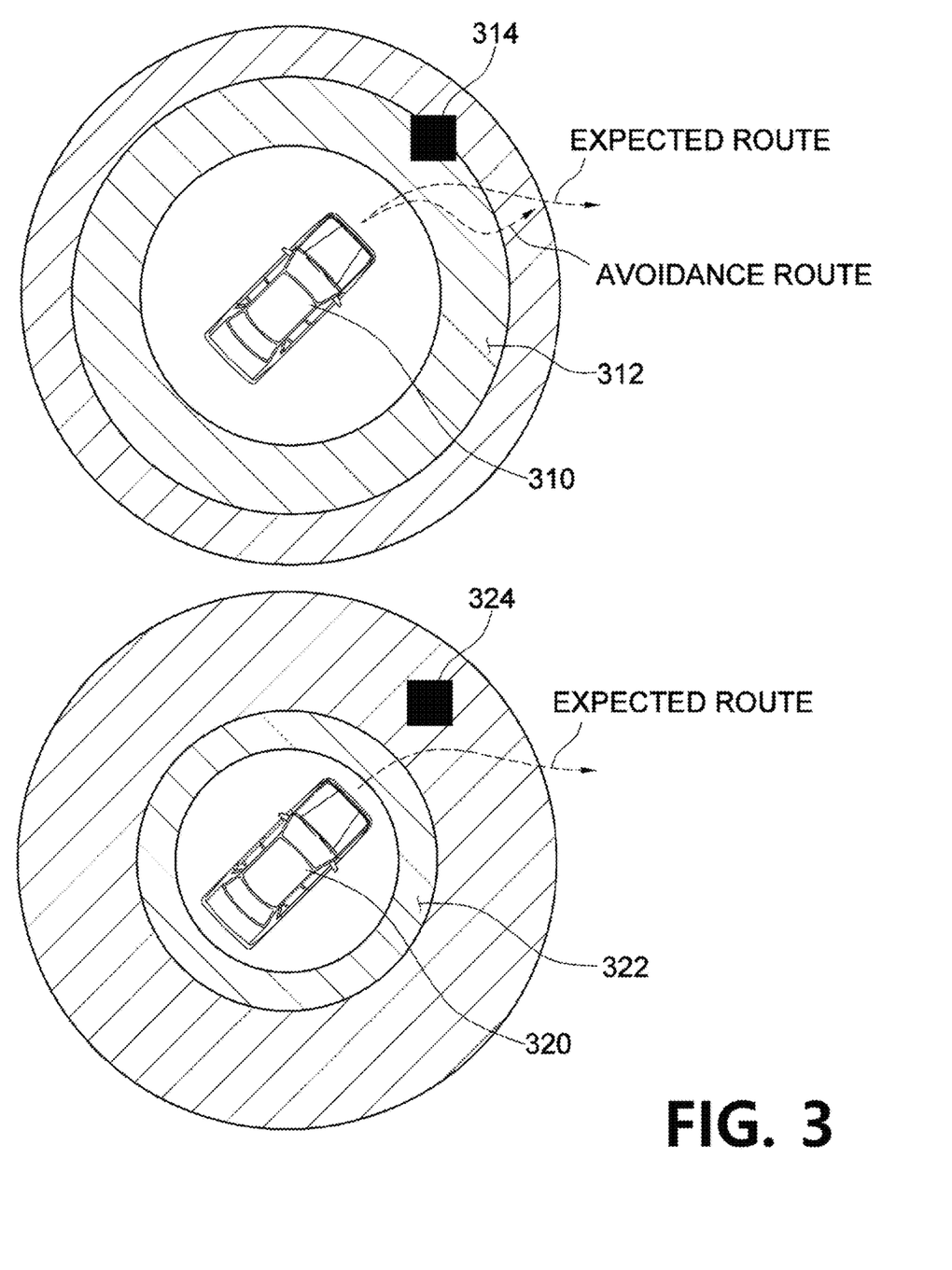
FIG. 3 is a diagram illustrating an example of a change of an obstacle detection area according to an exemplary embodiment of the present disclosure.

FIG. 3 is a diagram illustrating an example of a change of an obstacle detection area according to the exemplary embodiment of the present disclosure. As illustrated in FIG. 2, an obstacle detection area may exist around a first mobile robot 310. In this case, the obstacle detection area may include a safety area, a danger area, an attention area 312, or the like. Here, the obstacle detection area of the first mobile robot 310 may remain unchanged.

In general, the first mobile robot 310 may travel along an expected route. During the traveling, when an obstacle 314 is detected in the attention area 312, the first mobile robot 310 may set an avoidance route to avoid the recognized obstacle 314. That is, the first mobile robot 310 may change the route to the avoidance route and travel on the avoidance route when the obstacle 314 is detected in the attention area 312, regardless of whether there is an actual collision between the first mobile robot 310 and the obstacle 314.

Correspondingly, a second mobile robot 320 according to the present disclosure may have a variably changing obstacle detection area. For example, as the traveling speed and/or rotation speed of the second mobile robot 320 decreases, the size of the obstacle detection area may decrease. Further, the shape of the obstacle detection area may change depending on the direction in which the front surface of the second mobile robot 320 is facing and/or the heading angle.

In the example illustrated, the size of an attention area 322 may decrease according to the speed of the second mobile robot 320. In this case, an obstacle 324 may not be detected in the attention area 322 even though the second mobile robot 320 is traveling on the original expected route. In other words, the second mobile robot 320 may travel on the expected route even without setting a separate avoidance route due to the obstacle 324. By the foregoing configuration, it is possible to prevent unnecessary waste of computing resources, such as setting avoidance routes in situations where the possibility of colliding with obstacles is reduced by the speed of the mobile robot, and allow the mobile robot to travel a more efficient route to a destination.

Figure 4:
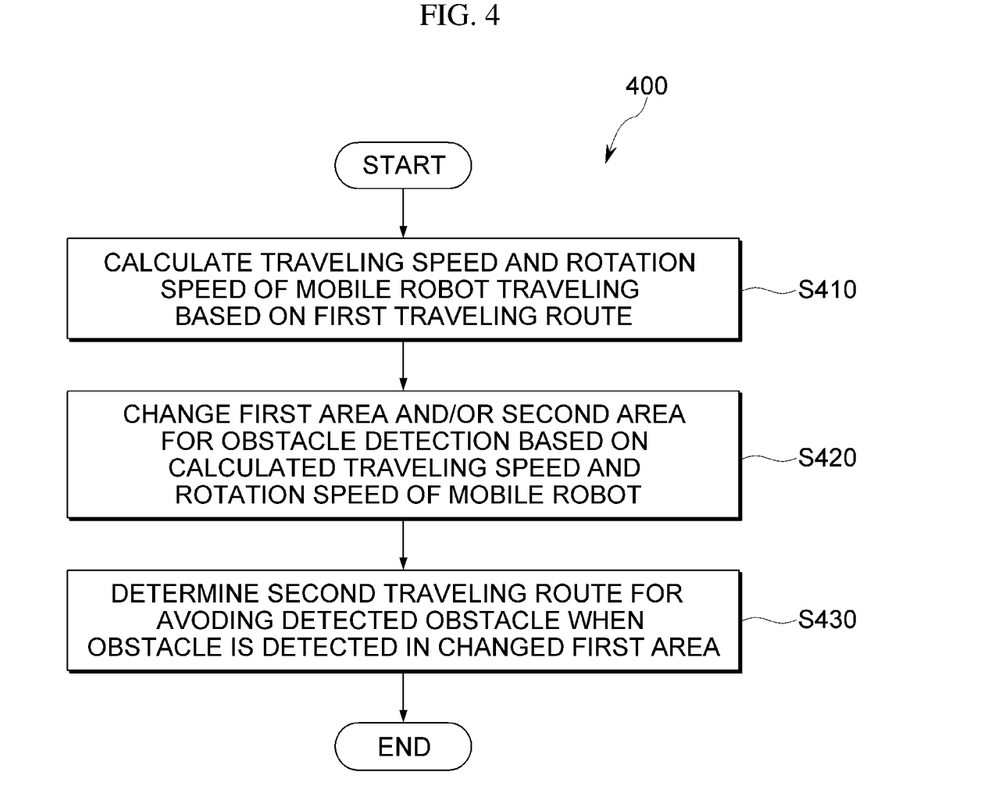
FIG. 4 is a flow diagram illustrating an example of a method of controlling a mobile robot according to an exemplary embodiment of the present disclosure.

FIG. 4 is a flow diagram illustrating an example of a method 400 of controlling a mobile robot according to an exemplary embodiment of the present disclosure. The method 400 of controlling the mobile robot may be performed by at least one processor (for example, at least one processor of a computing device). The method 400 of controlling the mobile robot may be initiated, by the processor, by calculating a traveling speed and a rotation speed of the mobile robot traveling based on a first travel route (S410).

The processor may change a first area and/or a second area for obstacle detection based on the calculated traveling speed and rotation speed of the mobile robot (S420). For example, the processor may increase the size of the first area and/or the second area as at least some of the traveling speed and the rotation speed of the mobile robot increase. Additionally or alternatively, the processor may detect a heading angle of the mobile robot based on the rotation speed, and change the shape of the first area and/or the second area based on the detected heading angle. For example, the processor may determine an expected turning route of the mobile robot based on the heading angle, and change the shape of the first area and/or the second area to correspond to the determined expected turning route. Additionally or alternatively, the processor may change the first area and/or the second area within a range of a predetermined third area indicating a safety area of the mobile robot. Here, the second area is defined within the first area and may be changed in size and/or shape within the range of the first area.

When an obstacle is detected on the changed first area, the processor may determine a second traveling route to avoid the detected obstacle (S430). The processor may also stop the mobile robot when an obstacle is detected in the changed second area.

Figure 5:
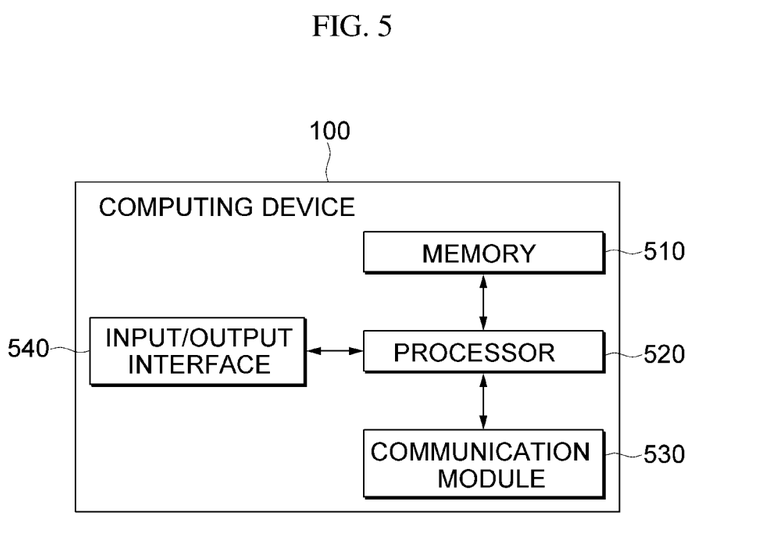
FIG. 5 is a block diagram illustrating an internal configuration of a computing device according to an exemplary embodiment of the present disclosure.

FIG. 5 is a block diagram illustrating an internal configuration of a computing device 100 according to an exemplary embodiment of the present disclosure. According to an exemplary embodiment, the computing device 100 may include a memory 510, a processor 520, a communication module 530, and an input/output interface 540. As illustrated in FIG. 5, the computing device 100 may be configured to communicate information and/or data over a network by using the communication module 530.

The memory 510 may include a predetermined non-transitory computer-readable recording medium. According to the exemplary embodiment, the memory 510 may include a permanent mass storage device, such as a Random Access Memory (RAM), a Read Only Memory (ROM), a disc drive, a Solid State Drive (SSD), and a flash memory. For another example, the permanent mass storage device, such as a ROM, an SSD, a flash memory, and a disc drive, may be included in the computing device 100 as a separate permanent storage device distinguished from the memory. Additionally, the memory 510 may store an operating system and at least one program code.

The software constituent elements may be loaded from a computer readable recording medium that is separate from the memory 510. The separate computer readable recording medium may include a recording medium directly connectable to the computing device 100, and may include, for example, a computer readable recording medium, such as a floppy drive, a disc, a tape, a DVD/CD-ROM drive, and a memory card. For another example, the software constituent elements may also be loaded to the memory 510 through the communication module 530, not the computer readable recording medium. For example, at least one program may be loaded into memory 510 based on a computer program that is installed by a developer or by files provided via the communication module 530 by a file distribution system that distributes installation files for the application.

The processor 520 may be configured to process an instruction of the computer program by performing basic arithmetic, logic, and input/output operations. The instruction may be provided by the memory 510 or the communication module 530 to a user terminal (not illustrated) or other external systems.

The communication module 530 may provide configuration or functionality for the user terminal (not illustrated) and the computing device 100 to communicate with each other over a network, and may provide configuration or functionality for the computing device 100 to communicate with an external system (for example, a separate cloud system). For example, control signals, instructions, data, and the like provided under the control of the processor 520 of the computing device 100 may be transmitted to the user terminal and/or the external system through the communication module 530 and the network through the communication module of the user terminal and/or the external system.

Additionally, the input/output interface 540 of the computing device 100 may be a means for interfacing with a device (not illustrated) for input or output that may be connected to or include the computing device 100. Although the I/O interface 540 is illustrated in FIG. 5 as a separate component from the processor 520, but is not limited thereto, and the I/O interface 540 may be configured to be included in the processor 520. The computing device 100 may include more constituent elements than those of FIG. 5. However, it is not necessary to clearly illustrate most of the constituent elements in the related art.

The processor 520 of the computing device 100 may be configured to manage, process, and/or store information and/or data received from a plurality of user terminals and/or a plurality of external systems.

The foregoing method and/or various exemplary embodiments may be implemented by a digital electronic circuit, computer hardware, firmware, software, and/or a combination thereof. Various exemplary embodiments of the present disclosure may be executed by a data processing device, for example, one or more programmable processors and/or one or more programmable computing devices, or may be implemented as a computer-readable recording medium and/or a computer program stored in a computer-readable recording medium. The computer program may be written in any form of programming language, including a compiled language or an interpreted language, and may be distributed in any form, such as a stand-alone program, module, and subroutine. A computer program may be distributed through a single computing device, a plurality of computing devices connected through the same network, and/or a plurality of computing devices distributed to be connected through a plurality of different networks.

The methods and/or various exemplary embodiments described above may be performed by one or more processors configured to execute one or more computer programs that process, store, and/or manage any function, functions, and the like by being operated based on input data and/or generating output data. For example, the method and/or various exemplary embodiments of the present disclosure may be performed by a special-purpose logic circuit, such as a Field Programmable Gate Array (FPGA) or an Application Specific Integrated Circuit (ASIC), and a device and/or system for performing the method and/or various exemplary embodiments of the present disclosure may be implemented as a special-purpose logic circuit, such as an FPGA or an ASIC.

One or more processors executing a computer program may include a general purpose or special purpose microprocessor and/or one or more processors of any kind of digital computing device. The processor may receive an instruction and/or data from each of the read-only memory and the random access memory, or receive an instruction and/or data from the read-only memory and the random access memory. In the present disclosure, the constituent components of the computing device performing the method and/or exemplary embodiments may include one or more processors for executing instructions, one or more memory devices for storing instructions and/or data.

According to the exemplary embodiment, the computing device may transceive data with one or more large-capacity storage devices for storing data. For example, the computing device may receive data from a magnetic disc or an optical disc and/or transmit the data to the magnetic disc or the optical disc. A computer readable storage medium suitable for storing instructions and/or data associated with the computer program may include a predetermined type of non-volatile memory including a semiconductor memory device, such as an Erasable Programmable Read-Only Memory (EPROM), an Electrically Erasable PROM (EEPROM), and a flash memory device, but is not limited thereto. For example, the computer readable storage medium may include an internal hard disc or a portable disc, such as a magnetic disc, an optical magnetic disc, and CD-ROM and DVD-ROM discs.

In order to provide interaction with a user, the computing device may include a display device (for example, a Cathode Ray Tube (CRT) and a Liquid Crystal Display (LCD)) for providing or displaying information to the user and a pointing device (for example, a keyboard, a mouse, and a trackball) capable of providing an input and/or an instruction to the computing device, but is not limited thereto. That is, the computing device may further include a predetermined different type of devices for providing interaction with a user. For example, for the interaction with the user, the computing device may provide the user with a predetermined type of sensory feedback including a visual feedback, an audible feedback, and/or a tactile feedback. In this regard, the user may provide input to the computing device through various gestures, such as visual, voice, and motion.

In the present disclosure, various exemplary embodiments may be implemented in a computing system including a back-end component (for example, a data server), a middleware component (for example, an application server), and/or a front-end component. In this case, the constituent elements may be mutually connected by a predetermined type or medium of digital data communication, such as a communication network. For example, the communication network may include a Local Area Network (LAN) and a Wide Area Network (WAN).

The computing device based on the illustrative exemplary embodiments described in the present specification may be implemented by using hardware and/or software which includes a user device, a User Interface (UI) device, a user terminal, or a client device and is configured to interact with a user. For example, the computing device may include a portable computing device, such as a laptop computer. Additionally or alternatively, the computing device may include a Personal Digital Assistant (PDA), a tablet PC, a game console, a wearable device, an Internet of Things (IoT) device, a Virtual Reality (VR) device, an Augmented Reality (AR) device, and the like, but is not limited thereto. The computing device may further include a different type of device configured to interact with a user. Additionally, the computing device may include a portable communication device (for example, a mobile phone, a smart phone, and a wireless cellular phone) suitable for wireless communication through a network, such as a mobile communication network. The computing device may be configured to wirelessly communicate with a network server by using wireless communication technologies, such as Radio Frequency (RF), Microwave Frequency (MWF), and/or Infrared Ray Frequency (IRF) and/or protocols.

In the present disclosure, various exemplary embodiments including specific structural and function details are illustrative. Therefore, the exemplary embodiments of the present disclosure are not limited to the foregoing, and may be implemented in various different forms. In addition, the term used in the present disclosure is for describing some exemplary embodiments, and is not interpreted to limit the exemplary embodiment. For example, singular words and the foregoing may be construed to include plural forms unless the context clearly indicates otherwise.

All of the terminologies containing one or more technical or scientific terminologies have the same meanings that persons skilled in the art understand ordinarily unless they are not defined otherwise. In addition, commonly used terms, such as dictionary-defined terms, should be interpreted to have a meaning consistent with their meaning in the context of the relevant art.

In the present specification, the present disclosure has been described in relation to some exemplary embodiments, but the present disclosure may be variously modified and changed within the range without departing from the scope of the present disclosure that those skilled in the art can understand. Furthermore, such modifications and changes are to be considered as falling within the scope of the claims appended to the present specification.

What is claimed is:

1. A method of controlling a mobile robot, the method being performed by at least one processor, the method comprising:
   calculating a traveling speed and a rotation speed of a mobile robot traveling based on a first traveling route;
   changing a first area for detecting an obstacle based on at least a portion of the calculated traveling speed and rotation speed of the mobile robot; and
   when an obstacle is detected in the changed first area, determining a second traveling route for avoiding the detected obstacle.

2. The method of claim 1, further comprising:
when an obstacle is not detected in the changed first area, controlling the mobile robot based on the first traveling route.

3. The method of claim 1, wherein the changing the first area for detecting the obstacle based on at least the portion of the calculated travel speed and rotation speed of the mobile robot includes increasing a size of the first area as at least the portion of the traveling speed and the rotation speed of the mobile robot increases.

4. A non-transitory computer-readable recording medium storing instructions for execution by one or more processors that, when executed by the one or more processors, cause the one or more processors to perform the method according to claim 1.

5. A computing device, comprising:
a communication module;
a memory; and
at least one processor connected with the memory and configured to execute at least one computer-readable program included in the memory,
wherein the at least one program includes instructions for
calculating a traveling speed and a rotation speed of a mobile robot traveling based on a first traveling route,
changing a first area for detecting an obstacle based on at least a portion of the calculated traveling speed and rotation speed of the mobile robot, and
when an obstacle is detected in the changed first area, determining a second traveling route for avoiding the detected obstacle.

6. The computing device of claim 5, wherein the at least one program further includes instructions for, when an obstacle is not detected in the changed first area, controlling the mobile robot based on the first traveling route.

7. The computing device of claim 5, wherein the at least one program further includes instructions for, increasing a size of the first area as at least the portion of the traveling speed and the rotation speed of the mobile robot increases.

* * * * *